Aug. 8, 1933.  W. E. FERGUSON  1,921,182
CRANK GEAR FOR PLUNGER PUMPS
Filed March 28, 1932　　2 Sheets-Sheet 1
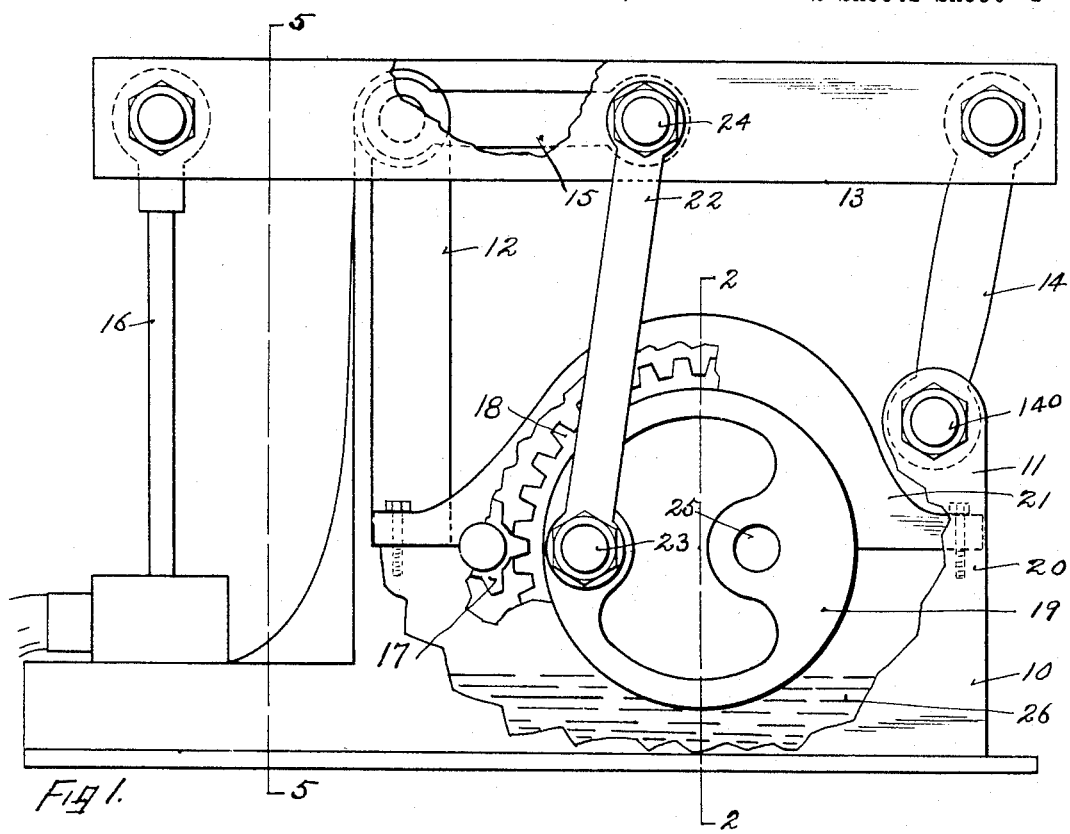
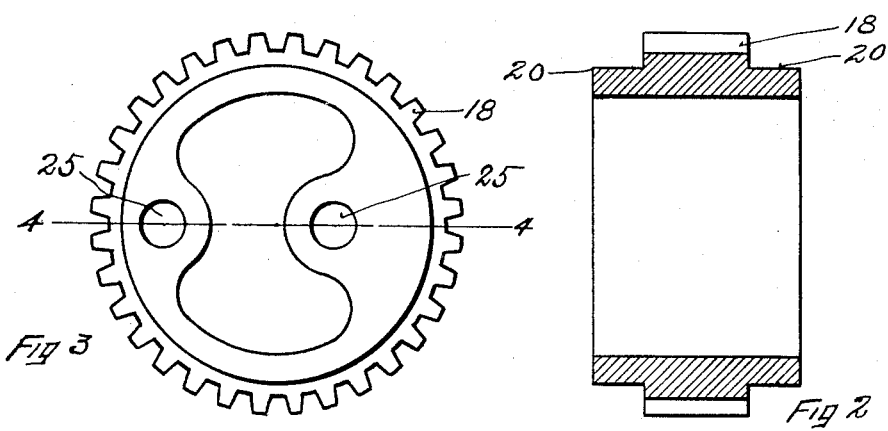
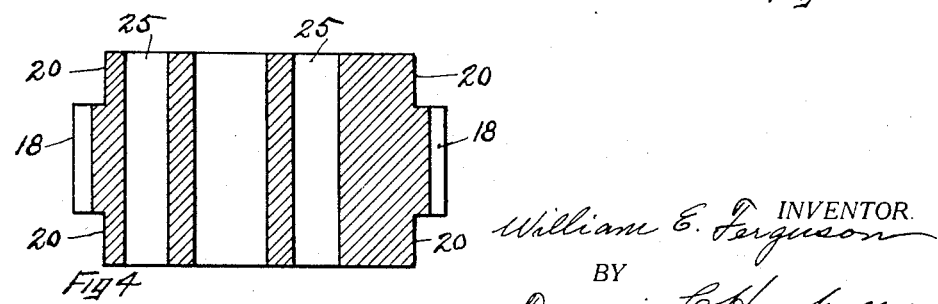
INVENTOR.
William E. Ferguson
BY
Francis C. Huebner
ATTORNEY.

Aug. 8, 1933.  W. E. FERGUSON  1,921,182
CRANK GEAR FOR PLUNGER PUMPS
Filed March 28, 1932   2 Sheets-Sheet 2

William E. Ferguson Inventor

By Francis C. Huebner
Attorney

Patented Aug. 8, 1933

1,921,182

UNITED STATES PATENT OFFICE 1,921,182

CRANK GEAR FOR PLUNGER PUMPS

William E. Ferguson, Orange Cove, Calif.

Application March 28, 1932. Serial No. 601,640

2 Claims. (Cl. 74—14)

My invention relates to a mechanism for operating a pump or similar tool where a rotary motion is changed to a reciprocating movement.

An object I have attained is the construction of a gear for changing a rotary movement into a reciprocating movement in which no axle is needed to support the gear, and in which the portion of the gear supported on the bearing is in the form of a journal and a crank-pin holding member. Other objects are the simplicity of construction, ease with which the stroke of the pitman can be lengthened or shortened, elimination of parts, enlarged size of bearings thus reducing wear to a minimum, automatic and constant oil lubrication, and other objects hereinafter referred to.

Figure 5:
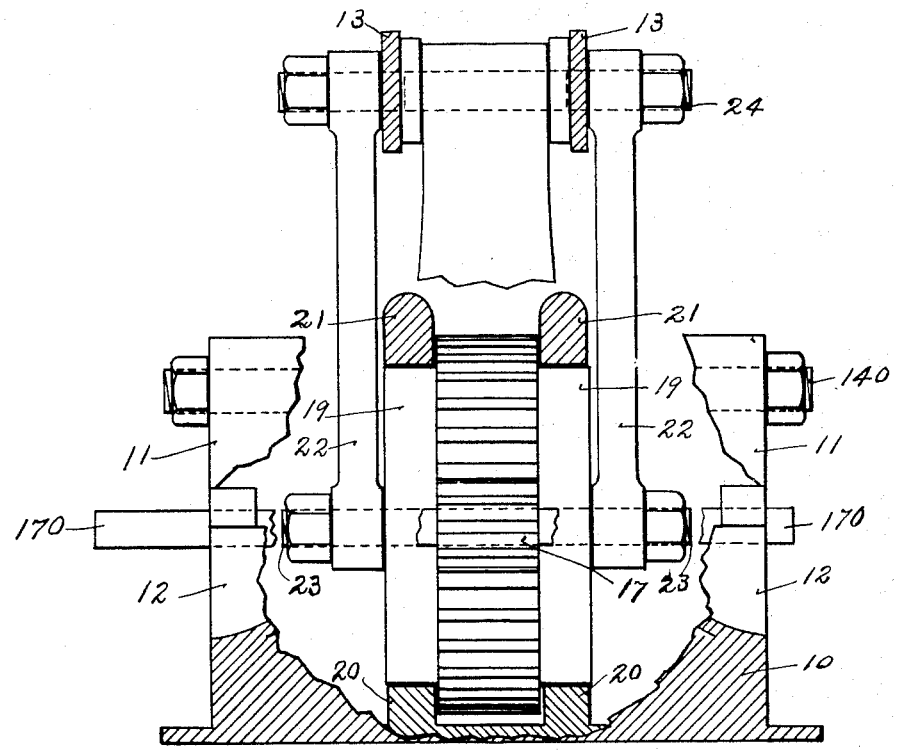
Figure 6:
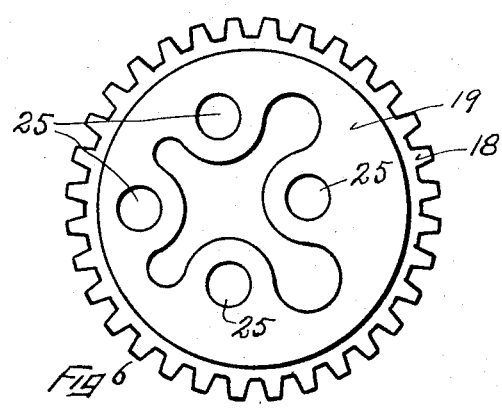

In the drawings herewith Fig. 1 is a side view of my device with parts cut away. Fig. 2 is a sectional view of the main gear of the device along sectional line 2—2 in Fig. 1. Fig. 3 is a face view of the main gear. Fig. 4 is a sectional view of the main gear along sectional line 4—4 in Fig. 3. Fig. 5 is a sectional view of the device along sectional line 5—5 in Fig. 1, also showing portions of the mechanism along section line 2—2. Fig. 6 is a face view of a modified form of the main gear with an annular bearing thereon having a plurality of holes for crank pins.

It is noted in the following description that reference is generally made to a plunger pump and mechanism for operating the same, but the device I have invented can be applied to similar mechanism used for other purposes than pumping liquids.

Referring to the drawings, a frame or box 10 is adapted to support the mechanism hereinafter described having posts 11 and 12. A walking beam 13 is pivotally attached by means of a pivotally mounted link 14 to post 11 and to post 12 by a guide link 15. The plunger rod 16 is pivotally attached to the walking beam at the end opposite the link attachment to post 11.

To actuate the walking beam I have power, not shown, transmitted to a pinion 17 which meshes with a larger gear 18. On each side of gear 18 is an annular member 19 which is attached to or made integral with gear 18 concentric therewith. The periphery of member 19 is finished as a journal to rotate in a bearing which may be formed in, or supported by portions of frame 10. The bearing as shown in the drawings consists of the lower or fixed portion 20, and a cap 21. The width of the bearing should be approximately the same width or slightly less than the width of annular member 19, to permit the pitman 22 to operate freely. Pitman 22 is coupled at one end to a crank pin 23 which is attached at right angles to the plane of the face of member 19. The opposite end of the pitman is journaled on wrist pin 24 attached to the walking beam. Thus on the rotation of gear 18, the walking beam would be given a reciprocating movement up and down through pitman 22.

It is noted that the walking beam is constructed of frame work and is approximately as wide as the combined width of gear 18 and annular member 19 on both sides thereof. A pitman 22 is attached to the annular members on each side of gear 18. I have found it advantageous to use one long bolt or rod to form the crank pins on opposing faces of the members forming the journals, and one wrist pin to connect both pitmans with the walking beam and guide link 15. A plurality of holes 25 is provided for a crank pin or bolt 23, so either one can be selectively used, and the length of the stroke can thus easily be changed when desired.

While I have shown the main gear driven by pinion 17, it is noted that said gear can be substituted by a wheel driven by a belt or a worm gear can be used.

It is also noted that the box 10 can be constructed to retain oil shown as 26 on Fig. 1, and the bearings can be easily and constantly lubricated.

It is further noted that my preferred form of the crank pin supports is to have projections or arms, or lobes attached or formed integral with the annular extension on the inside thereof, and extending toward the center of said extensions.

I claim as new and ask for Letters Patent:

1. In a device of the character described, the combination of a driven wheel with means for driving said wheel, said driven wheel having a duplicate annular extension concentric with the driven wheel on each face thereof, the peripheries of said annular extensions being adapted as journals, bearings adapted for said journals to rotate therein, a plurality of openings in said annular extensions, the openings in each of said annular extensions registering with similar openings in the other extension, said openings being adapted to carry a crank pin of such length that it extends beyond the face of each of said extensions.

2. In a plunger pump having a walking beam, and crank means for actuating the walking beam, of a main gear with means for rotating said main gear through a cooperating gear, said main gear having annular extensions concentric with the main gear, the peripheries of the annular extensions being adapted as a journal, bearings adapted for said journals to rotate therein, the faces of said extensions having a plurality of holes therethrough, the holes of one of said extensions registering with the holes in the other extension, said holes selectively being adapted for holding a crank pin, and pitman rods connecting the walking beam with said crank pins.

WILLIAM E. FERGUSON.